July 9, 1963  W. J. NEILSON  3,096,835
BEARING SEAL FOR ROTARY ROCK BITS
Filed Jan. 2, 1962
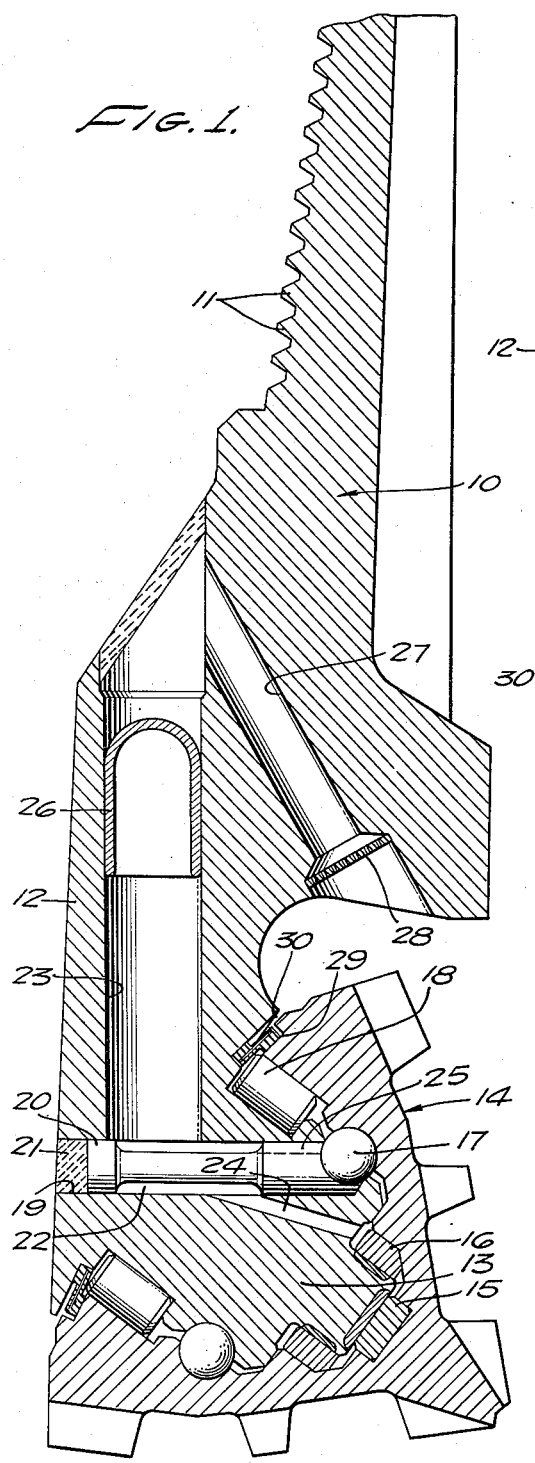
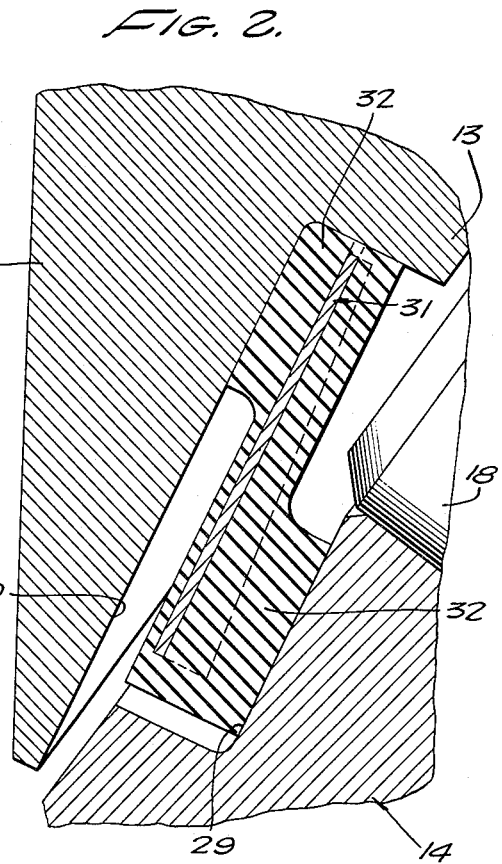
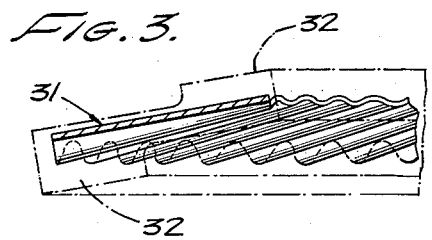
WILLIAM J. NEILSON
INVENTOR.
BY Hazard & Miller
ATTORNEYS

United States Patent Office 3,096,835
Patented July 9, 1963

3,096,835
BEARING SEAL FOR ROTARY ROCK BITS
William J. Neilson, Whittier, Calif., assignor to Smith Industries International, Inc., Compton, Calif., a corporation of California
Filed Jan. 2, 1962, Ser. No. 163,793
1 Claim. (Cl. 175—371)

This invention relates to a bearing seal for rotary rock bits.

Explanatory of the present invention, rotary rock bits have heretofore been designed wherein the body of the bit has one or more downwardly extending legs, each of which is equipped with a downwardly and inwardly extending journal on which a cone or cutter is rotatably mounted.

A bearing is provided between the cone or cutter and the journal which frequently includes an anti-friction ball thrust bearing and an anti-friction roller radial bearing. It has heretofore been proposed to supply the bearing between the cone or cutter and the journal with lubricant and to provide a seal between the outer face of the cone or cutter and a face on the leg of the body that surrounds the journal. Such a seal is intended to confine lubricant in the bearing and to prevent ingress of abrasive material into the bearing. The opposed faces between the outer end of the cone or cutter and the body have heretofore been arranged on planes perpendicular to the axis of the journal. Such an arrangement necessitated the use of an unnecessarily short roller or radial bearing. Furthermore, if the seal employed were in the nature of a dished frusto-conical or Belleville spring-type of seal the seal on being stressed between the opposed perpendicular faces would be unnecessarily deformed from its frusto-conical shape into a substantially flat shape so that the metal or material from which it was formed tended to quickly fatigue.

A primary object of the present invention is to provide an improved seal between the outer end of the cone or cutter of a rock bit and the body of the bit surrounding the journal wherein the opposed faces, instead of being perpendicular to the axis of the journal, are non-perpendicular thereto and are preferably canted. With such an arrangement the rollers of the roller radial bearing between the cone and the journal can be lengthened materially, increasing their load-carrying capacity. Furthermore, as the opposed faces on the cone and the body are frusto-conical, a frusto-conical seal can be employed therebetween which will largely retain its initial frusto-conical shape and not be flattened as would be the case if the opposed faces were perpendicular to the axis of the journal.

With the foregoing and other objects in view, which will be made manifest in the following detailed description and specifically pointed out in the appended claims, reference is had to the accompanying drawings for an illustrative embodiment of the invention, wherein:

FIGURE 1 is a vertical section through a leg of a rock bit illustrating a cone or cutter rotatably mounted upon the journal thereof and illustrating the seal embodying the present invention as having been incorporated therein;

FIG. 2 is a partial view in vertical section on an enlarged scale illustrating a portion of FIG. 1; and FIG. 3 is a partial view in vertical section illustrating the metallic part of the seal and illustrating in phantom lines the covering therefor.

Referring to the accompanying drawings wherein similar reference characters designate similar parts throughout, the general construction of the rock bit illustrated may be regarded as conventional wherein the body of the bit is made up of parts 10 which are assembled together and are externally threaded as at 11 for attachment to a well drilling string. Each part has a downwardly extending leg 12 terminating in a downwardly and inwardly inclined journal 13.

A cone or collar cutter 14 is rotatably mounted on the journal such as by friction hard metal thrust and radial bearings 15 and 16, and anti-friction thrust and radial bearings 17 and 18. Friction bearings 15 and 16 are usually employed at the small end of the cone and journal because of space limitations. The thrust bearing 17 is usually a ball bearing and the radial bearing 18 is usually a roller bearing.

In conformity with general practice the rollers 18 are applied to their race on the journal 13 prior to the application of the cone 14 to the bearing. The balls 17 are fed into their races through a ball opening or port 19 which is closed thereafter by means of a ball plug 20 welded in place such as by a weld 21. The exterior of the ball plug is relieved or annularly grooved as at 22 so that lubricant in an equalizer cylinder 23 can be forced into the bearing through passages 24 and 25 formed in the journal and in the ball plug, respectively.

In the equalizing cylinder 23 there is a flexible rubber diaphragm or boot 26 which keeps circulation fluid from coming in direct contact with the lubricant although hydrostatic pressure can be transmitted to the top thereof through an equalizer port 27 through a screen 28.

The present invention is concerned with providing a seal between the outer surface of the cone 14 and the inner surface of the leg 12 surrounding the journal 13 so that lubricant will not escape from the bearing and abrasive material cannot enter the bearing and reduce its life.

In accordance with the present invention the outer end of the cone 14 is formed with a frusto-conical face 29 and the leg 12 around the journal is formed with a frusto-conical face 30. These faces have heretofore been formed on the cone and on the leg 12 in planes that are perpendicular to the axis of the journal 13. As a result thereof the lengths of the rollers 18 have been unnecessarily shortened. In accordance with the present invention as the face 29 is frusto-conical and is not arranged perpendicular to the axis of the journal 13 the rollers 18 can be lengthened as illustrated. Space limitations in rock bits are such that even a small amount of increase in length of the rollers 18 of the radial bearing materially increases the load-carrying capacity of this bearing which is highly desirable.

The face 30 formed on the leg 12 is frusto-conical and is preferably parallel to the face 29. I find it advantageous to have the inclination of both faces approximately 10° to the perpendicular to the axis of the journal. Between these faces there is a seal. This seal consists of a frusto-conical metal member 31 that is preferably radially corrugated as illustrated in FIGS. 2 and 3. Both side of this metal member have rubber or rubber-like composition indicated at 32 vulcanized thereto so that near the inner edge of the metal member there is a pad of rubber or the equivalent bearing against the frusto-conical face 30 and near the outer edge of the metal member 31 there is a rubber pad which bears against the frusto-conical face 29.

With this arrangement it will be noted that the metal member which forms the skeleton of the seal retains its dished or frusto-conical shape to a large extent after the bit has been completely assembled together. Consequently, as the metal core member 31 is not flattened to any large extent the fatiguing of this metal is not apt to occur. Heretofore, when the opposed faces 29 and 30 were arranged in planes perpendicular to the axis of the journal 13 a dished or frusto-conical seal has to be largely flattened between the opposed faces when the bit was assembled. With the present arrangement, not only is it possible to lengthen the rollers 18 of the radial bearing but it is not necessary to materially flatten the frusto-conical seal from its unstressed or normal frusto-conical shape. Consequently, the life of the seal is materially prolonged.

Various changes may be made in the details of construction without departing from the spirit and scope of the invention as defined by the appended claim.

I claim:

A well drilling bit having a body, a journal on the body, a cutter rotatable on the journal, a bearing between the cutter and the journal, means for introducing a lubricant into the bearing, there being opposed substantially parallel frusto-conical faces on the body and on the cutter about the journal, said frusto-conical faces sloping angularly with respect to the longitudinal axis of the body, cutter and journal, and a frusto-conical seal disposed between the faces bearing near its outer edge on the face on the cutter and bearing near its inner edge against the face on the body whereby the available annular space defined between the bottom inner edge of the frusto-conical seal abutting the face of the body and the end of the bearing is effectively increased so that the length of the bearing may be increased and ingress of extraneous material from the well bore is effectively prevented.

References Cited in the file of this patent

UNITED STATES PATENTS

| | | |
|---|---|---|
| 1,885,266 | Johnson | Nov. 1, 1932 |
| 2,297,192 | Reed | Sept. 29, 1942 |
| 2,797,067 | Fisher | June 25, 1957 |
| 2,861,780 | Butler | Nov. 25, 1958 |

FOREIGN PATENTS

| | | |
|---|---|---|
| 862,104 | Great Britain | Mar. 1, 1961 |